(12) United States Patent
Blum et al.

(10) Patent No.: US 6,982,649 B2
(45) Date of Patent: *Jan. 3, 2006

(54) FLOOR DISPLAY SYSTEM WITH INTERACTIVE FEATURES

(75) Inventors: Ronald D. Blum, Roanoke, VA (US); J. Thomas Walker, Frederick, MD (US); Barry H. Whalen, Alamo, CA (US); Joseph A. Thibodeau, Roanoke, VA (US); Bradley J. Blum, Roanoke, VA (US); Dwight P. Duston, Laguna Niguel, CA (US); William Kokonaski, Gig Harbor, WA (US)

(73) Assignee: Intellimats, LLC, Roanoke, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/438,923

(22) Filed: May 16, 2003

(65) Prior Publication Data

US 2004/0001002 A1    Jan. 1, 2004

Related U.S. Application Data

(63) Continuation-in-part of application No. 10/285,639, filed on Nov. 1, 2002, now Pat. No. 6,873,266, which is a continuation of application No. 10/137,357, filed on May 3, 2002, now Pat. No. 6,507,285, and a continuation of application No. 09/767,846, filed on Jan. 24, 2001, now Pat. No. 6,417,778, and a continuation of application No. 09/418,752, filed on Oct. 15, 1999, now abandoned, and a continuation-in-part of application No. 09/304,051, filed on May 4, 1999, now Pat. No. 6,219,876.

(60) Provisional application No. 60/378,070, filed on May 16, 2002.

(51) Int. Cl.
    *G08B 5/00* (2006.01)

(52) U.S. Cl. .............................. 340/815.4; 340/572.1; 340/691.6; 362/276; 434/1

(58) Field of Classification Search ............ 340/815.4, 340/691.6, 572.1, 573.1, 5.8, 332, 540, 541, 340/565, 567; 235/375, 380, 381; 40/446, 40/463, 541, 560; 434/81, 1, 112, 247, 308, 434/365, 389, 428; 482/1; 362/802, 276, 362/811; 705/14
See application file for complete search history.

(56) References Cited

U.S. PATENT DOCUMENTS 2,191,707 A    2/1940    Bennett (Continued)

FOREIGN PATENT DOCUMENTS

DE    3147113 A1    11/1981

(Continued)

OTHER PUBLICATIONS

Patent Abstracts of Japan, vol. 1995, No. 05, Jun. 30, 1995 & *JP 07 036395 A* (Toray Ind Inc), Feb. 7, 1995.

(Continued)

*Primary Examiner*—Thomas Mullen
(74) *Attorney, Agent, or Firm*—Kenyon & Kenyon

(57) ABSTRACT

Embodiments of the present invention relate to a floor display system with interactive features. The floor display system may be arranged in a public place, and be configured to display electronically modifiable arbitrary content, such as advertising or other informational content. The floor display system may be configured to detect an indication of the presence or activity of a person in the vicinity, and upon detecting the indication, perform a corresponding action in response, such as generating a predetermined display or audio output.

76 Claims, 9 Drawing Sheets

U.S. PATENT DOCUMENTS

| | | | |
|---|---|---|---|
| 2,254,830 A | 9/1941 | Schloss | |
| 2,276,104 A * | 3/1942 | Shaunessey | 40/560 |
| 2,282,672 A | 5/1942 | Nelson | |
| 2,512,310 A | 6/1950 | Corson | |
| 2,791,852 A * | 5/1957 | Laskow et al. | 40/560 |
| 2,800,215 A | 7/1957 | Converse | |
| 2,843,868 A | 7/1958 | Borgstorm | |
| 2,919,456 A | 1/1960 | Spivey | |
| 3,078,490 A | 2/1963 | Etcher | |
| 3,083,393 A | 4/1963 | Nappi | |
| 3,141,522 A | 7/1964 | Fitzpatrick | |
| 3,183,116 A | 5/1965 | Schaar | |
| 3,300,275 A | 1/1967 | Lorman | |
| 3,400,421 A | 9/1968 | Nappi et al. | |
| 3,435,481 A | 4/1969 | Kessler | |
| 3,501,797 A | 3/1970 | Nappi | |
| 3,517,407 A | 6/1970 | Wyant | |
| 3,578,738 A | 5/1971 | Hughes | |
| 3,663,980 A | 5/1972 | Conklin | |
| 3,665,543 A | 5/1972 | Nappi | |
| 3,696,459 A | 10/1972 | Kucera et al. | |
| 3,699,926 A | 10/1972 | Stockl | |
| 3,717,897 A | 2/1973 | Amos et al. | |
| 3,785,102 A | 1/1974 | Amos | |
| 3,886,620 A | 6/1975 | Miller | |
| 3,908,578 A | 9/1975 | Huber | |
| 3,909,996 A | 10/1975 | Ettlinger, Jr. et al. | |
| 3,916,401 A | 10/1975 | Freeman | |
| 3,930,084 A | 12/1975 | Shields | 428/67 |
| 4,107,811 A | 8/1978 | Imsande | |
| 4,126,854 A | 11/1978 | Sheridon | |
| 4,143,103 A | 3/1979 | Sheridon | |
| 4,143,194 A | 3/1979 | Wihksne | |
| 4,328,275 A | 5/1982 | Vargo | |
| 4,353,944 A | 10/1982 | Tarui | |
| 4,421,809 A | 12/1983 | Bish et al. | |
| 4,435,451 A | 3/1984 | Neubert | |
| 4,439,474 A | 3/1984 | Sagel | |
| 4,482,593 A | 11/1984 | Sagel et al. | |
| 4,484,250 A | 11/1984 | Rzepecki et al. | |
| 4,559,250 A | 12/1985 | Paige | |
| 4,564,546 A | 1/1986 | Jones | |
| 4,609,580 A | 9/1986 | Rockett et al. | |
| 4,614,679 A | 9/1986 | Farrington et al. | |
| 4,660,828 A * | 4/1987 | Weiss | 482/123 |
| 4,665,342 A | 5/1987 | Topp et al. | 313/505 |
| 4,707,895 A | 11/1987 | Lang | |
| 4,720,789 A | 1/1988 | Hector et al. | |
| 4,752,114 A | 6/1988 | French | 350/96.24 |
| 4,798,754 A | 1/1989 | Tomek | |
| 4,822,669 A | 4/1989 | Roga | |
| 4,853,678 A | 8/1989 | Bishop, Jr. et al. | |
| 4,917,975 A | 4/1990 | De Guzman | |
| 4,959,265 A | 9/1990 | Wood | |
| 4,974,857 A * | 12/1990 | Beall et al. | 273/371 |
| 5,018,235 A | 5/1991 | Stamatiou | |
| 5,071,628 A | 12/1991 | Alazet | |
| 5,117,221 A * | 5/1992 | Mishica, Jr. | 340/556 |
| 5,142,733 A | 9/1992 | Mogez | |
| 5,161,041 A | 11/1992 | Abileah et al. | 359/40 |
| 5,204,159 A | 4/1993 | Tan | |
| 5,293,660 A | 3/1994 | Park | |
| 5,305,197 A * | 4/1994 | Axler et al. | 705/14 |
| 5,335,788 A | 8/1994 | Beasley et al. | |
| 5,344,693 A | 9/1994 | Sanders | |
| 5,460,381 A | 10/1995 | Smith et al. | 273/238 |
| 5,461,748 A | 10/1995 | Koiduka | |
| 5,483,049 A * | 1/1996 | Schulze, Jr. | 705/14 |
| 5,500,267 A | 3/1996 | Canning | |
| 5,556,685 A | 9/1996 | Swicegood, Jr. | |
| 5,561,446 A | 10/1996 | Montlick | 345/173 |
| 5,562,580 A | 10/1996 | Beasley et al. | |
| 5,571,628 A | 11/1996 | Cumming et al. | |
| 5,575,294 A * | 11/1996 | Perry et al. | 600/587 |
| 5,589,246 A | 12/1996 | Calhoun | |
| 5,604,027 A | 2/1997 | Sheridon | |
| 5,613,313 A | 3/1997 | Homan et al. | |
| 5,646,818 A | 7/1997 | Hahn | 361/681 |
| 5,658,637 A | 8/1997 | Volz | |
| 5,703,564 A | 12/1997 | Begum et al. | 340/539 |
| 5,723,204 A | 3/1998 | Stefik | |
| 5,747,133 A | 5/1998 | Vinod et al. | 428/46 |
| 5,805,117 A | 9/1998 | Mazurek et al. | 345/1 |
| 5,815,995 A | 10/1998 | Adam | |
| 5,816,550 A | 10/1998 | Watanabe et al. | 248/222.11 |
| 5,826,874 A | 10/1998 | Teitell et al. | |
| 5,839,976 A | 11/1998 | Darr | 473/414 |
| 5,848,830 A | 12/1998 | Castle et al. | 362/84 |
| 5,869,350 A | 2/1999 | Heeger et al. | |
| 5,885,684 A | 3/1999 | Hefner et al. | 428/89 |
| 5,886,474 A | 3/1999 | Asai et al. | 315/169.1 |
| 5,913,727 A * | 6/1999 | Ahdoot | 463/39 |
| 5,945,502 A | 8/1999 | Hsieh et al. | |
| 5,954,592 A * | 9/1999 | Laffer et al. | 473/220 |
| 5,971,761 A * | 10/1999 | Tillman, Sr. | 434/81 |
| 6,001,456 A | 12/1999 | Newland | |
| 6,010,429 A * | 1/2000 | Prueitt | 482/4 |
| 6,084,526 A * | 7/2000 | Blotky et al. | 340/691.6 |
| 6,219,876 B1 | 4/2001 | Blum | |
| 6,233,776 B1 | 5/2001 | Blum et al. | |
| 6,247,650 B1 * | 6/2001 | Vachette et al. | 235/487 |
| 6,353,291 B1 | 3/2002 | Borgogno et al. | |
| 6,378,925 B1 * | 4/2002 | Greenlee | 294/171 |
| 6,417,778 B2 | 7/2002 | Blum et al. | |
| 6,630,948 B1 * | 10/2003 | Walker | 348/168 |
| 2001/0011399 A1 | 8/2001 | Blum et al. | |
| 2002/0186221 A1 | 12/2002 | Bell | 345/474 |
| 2003/0066073 A1 | 4/2003 | Rebh | |
| 2004/0051644 A1 * | 3/2004 | Tamayama et al. | 340/686.1 |

FOREIGN PATENT DOCUMENTS

| | | |
|---|---|---|
| DE | 3 147 113 | 6/1983 |
| DE | 87 01 817 | 4/1987 |
| DE | 3 923 959 | 10/1990 |
| DE | 3923959 | 10/1990 |
| DE | 3 915 254 | 11/1990 |
| DE | 4006781 | 9/1991 |
| DE | 4135877 | 5/1993 |
| DE | 298 11 821 | 10/1998 |
| EP | 0 009 891 | 4/1980 |
| EP | 0 188 005 | 7/1986 |
| EP | 0 199 537 | 10/1986 |
| EP | 0 202 846 | 11/1986 |
| EP | 0 353 139 | 1/1990 |
| EP | 0 354 281 | 2/1990 |
| EP | 0 359 478 | 3/1990 |
| EP | 0 365 869 | 5/1990 |
| EP | 0 374 860 | 6/1990 |
| EP | 0 421 258 | 4/1991 |
| EP | 0 448 768 | 10/1991 |
| EP | 0 512 904 | 11/1992 |
| EP | 0 514 191 | 11/1992 |
| EP | 0 554 641 | 8/1993 |
| EP | 0 573 277 | 12/1993 |
| EP | 0 624 125 | 11/1994 |
| EP | 0 624 681 | 11/1994 |
| EP | 0 648 834 | 4/1995 |
| EP | 0 721 176 | 7/1996 |
| EP | 0 751 213 | 1/1997 |
| EP | 0 794 244 | 9/1997 |
| EP | 0 839 900 | 5/1998 |
| EP | 0 895 745 | 2/1999 |
| EP | 0 971 064 | 1/2000 |

| | | |
|---|---|---|
| FR | 2 532 095 | 2/1984 |
| GB | 319 416 | 9/1929 |
| GB | 433 133 | 8/1935 |
| GB | 2 182 242 | 5/1987 |
| GB | 2 263 003 A | 7/1993 |
| JP | 4 144 532 | 5/1992 |
| JP | 6-90891 | 4/1994 |
| JP | 6 189 890 | 7/1994 |
| JP | 8056810 | 3/1996 |
| JP | 08-239988 | 9/1996 |
| JP | 10-057728 | 3/1998 |
| JP | 11-109901 | 4/1999 |
| JP | 109901 | 4/1999 |
| JP | 2000-105558 | 4/2000 |
| JP | 2002-00059 | 7/2000 |
| JP | 2000-322009 | 11/2000 |
| WO | 91/08701 | 6/1991 |
| WO | 93/20536 | 10/1993 |
| WO | 00/07811 | 2/2000 |
| WO | 00/16682 | 3/2000 |
| WO | 00/79871 | 4/2000 |
| WO | 00/29209 | 5/2000 |
| WO | 01/27909 A1 | 4/2001 |
| WO | 01/77746 | 10/2001 |
| WO | 0211110 | 2/2002 |
| WO | 02/22972 | 3/2002 |
| WO | 02065451 | 8/2002 |
| WO | 00/19871 | 4/2003 |

OTHER PUBLICATIONS

Patent Abstracts of Japan, vol. 1997, No. 01, Jan. 31, 1997 & *JP 08 239988* (Meitaku Syst:kk), Sep. 17, 1996.
Patent Abstracts of Japan, vol. 2002 & *JP 2002 062832* A (Nippon Signal Co Ltd:the), Feb. 28, 2002.
Patent Abstracts of Japan, vol. 1995, No. 01, Feb. 28, 1995 & *JP 06 299682* A (Jiyonsuton:kk), Oct. 25, 1994.
Co-pending U.S. Appl. No. 10/373,191, filed Feb. 26, 2003.
Co-pending U.S. Appl. No. 10/454,631, filed Jun. 5, 2003.
Co-pending U.S. Appl. No. 10/682,435, filed Oct. 10, 2003.
Co-pending U.S. Appl. No. 10/759,167, filed Jan. 20, 2004.
Protective Products Advertisement, date unknown.
Sole-Parmer Advertisement, date unknown.
3m Clean-Walk Mat, 5800 Series, Technical Data, Jul. 1995.
Advertising Materials for Alma, (Advanced Laminated Material Applications, Inc.), ClenStep Contamination Control Mat, 12 pages, 1999.
"Displaying a Winning Glow", Michael Kenward, Technology Review, Jan./Feb. 1999, vol. 102, No. 1, 7 pages.
"Screen Saviors", Michael Mattis, Business 2.0, Jul. 1999, 1 page.
"What's New", "Intelligent Ink", Advertising Material, Popular, 1 page, no date.
"Electronic Ink", Glen Sanders, ebooknet.com, 2 pages, Sep. 20, 1999.
MMR Journal, "Floor Decals New Wrinkle In P-O-P Ads", vol. 16, No. 10, p. 13, Apr. 5, 1999, USA.
Philadelphia Enquirer, "Cherry Hill, N.J. Firm Wants You To Look Down On Its Ads", Regional Newspaper, Aug. 27, 1998, USA.
"Floor Graphics" advertisements, copyright 2002.
U.K. Patent Office Search report dated May 28, 2003.

* cited by examiner

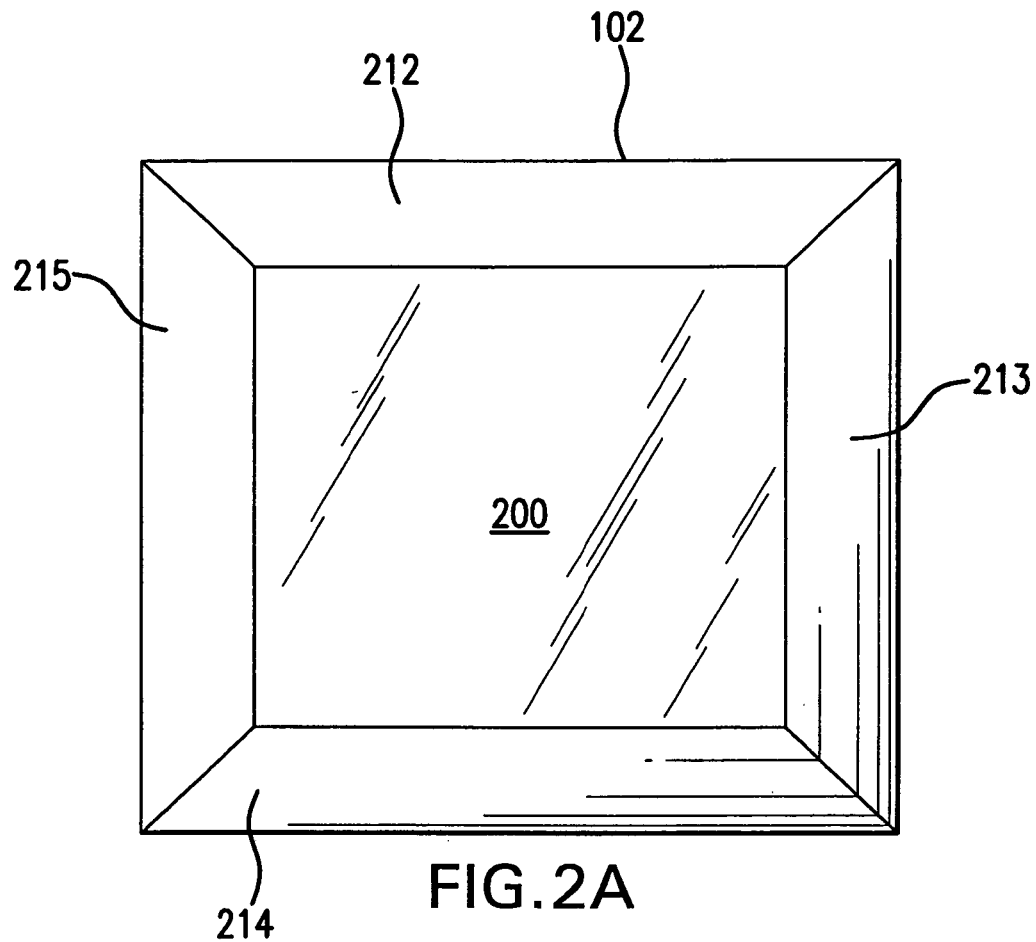
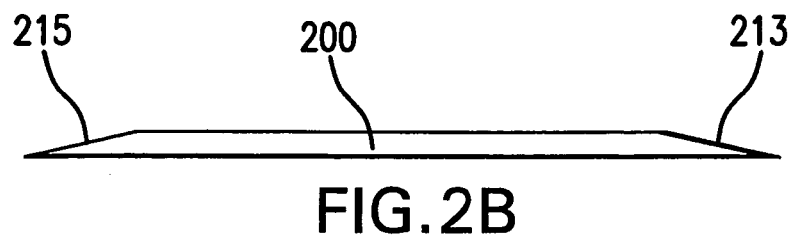
FIG.2A
FIG.2B

FLOOR DISPLAY SYSTEM WITH INTERACTIVE FEATURES

CROSS-REFERENCE TO RELATED APPLICATIONS

This application claims the benefit under 35 U.S.C. §119 (e) of U.S. provisional application 60/378,070, filed May 16, 2002. This application is a continuation-in-part of application Ser. No. 10/285,639, filed Nov. 1, 2002, now U.S. Pat. No. 6,873,266), which is a continuation of application Ser. No. 10/137,357, filed May 3, 2002, and issued as U.S. Pat. No. 6,507,285 on Jan. 14, 2003. Application Ser. No. 10/137,357 is a continuation of application Ser. No. 09/767,846, filed Jan. 24, 2001, and issued as U.S. Pat. No. 6,417,778 on Jul. 9, 2002. Application Ser. No. 09/767,846 is a continuation of application Ser. No. 09/418,752, filed Oct. 15, 1999, and now abandoned. Application Ser. No. 09/418,752 is a continuation-in-part of application Ser. No. 09/304,051, filed May 4, 1999, and issued as U.S. Pat. No. 6,219,876 on Apr. 24, 2001.

FIELD OF THE INVENTION

The present invention relates to a floor display system, and more specifically to a number of configurations and methods for adapting a floor display system to various commercial applications.

BACKGROUND

A number of media are known for publicly conveying information, such as advertising information. Most commonly, such media utilize "vertical space." That is, the media are typically such things as billboard displays, displays mounted on walls or ceilings, and displays on electronic devices such as television screens and computer monitor screens that are substantially vertical.

However, there is a vast amount of "horizontal space" that is largely unused for publicly conveying information. This horizontal space includes floor space in areas of public traffic, such as commercial establishments or other public buildings.

U.S. Pat. No. 6,417,778, which is fully incorporated herein by reference, discloses a system for electronically conveying information via a floor display. The present disclosure relates to a number of advantageous improvements and enhancements to such a floor display system. In particular, a floor display system including a number of interactive features for use in various commercial or other public applications is disclosed.

BRIEF DESCRIPTION OF THE DRAWINGS

FIGS. 2A–2E illustrate details of a floor covering of the floor display system;

DETAILED DESCRIPTION

Figure 1:
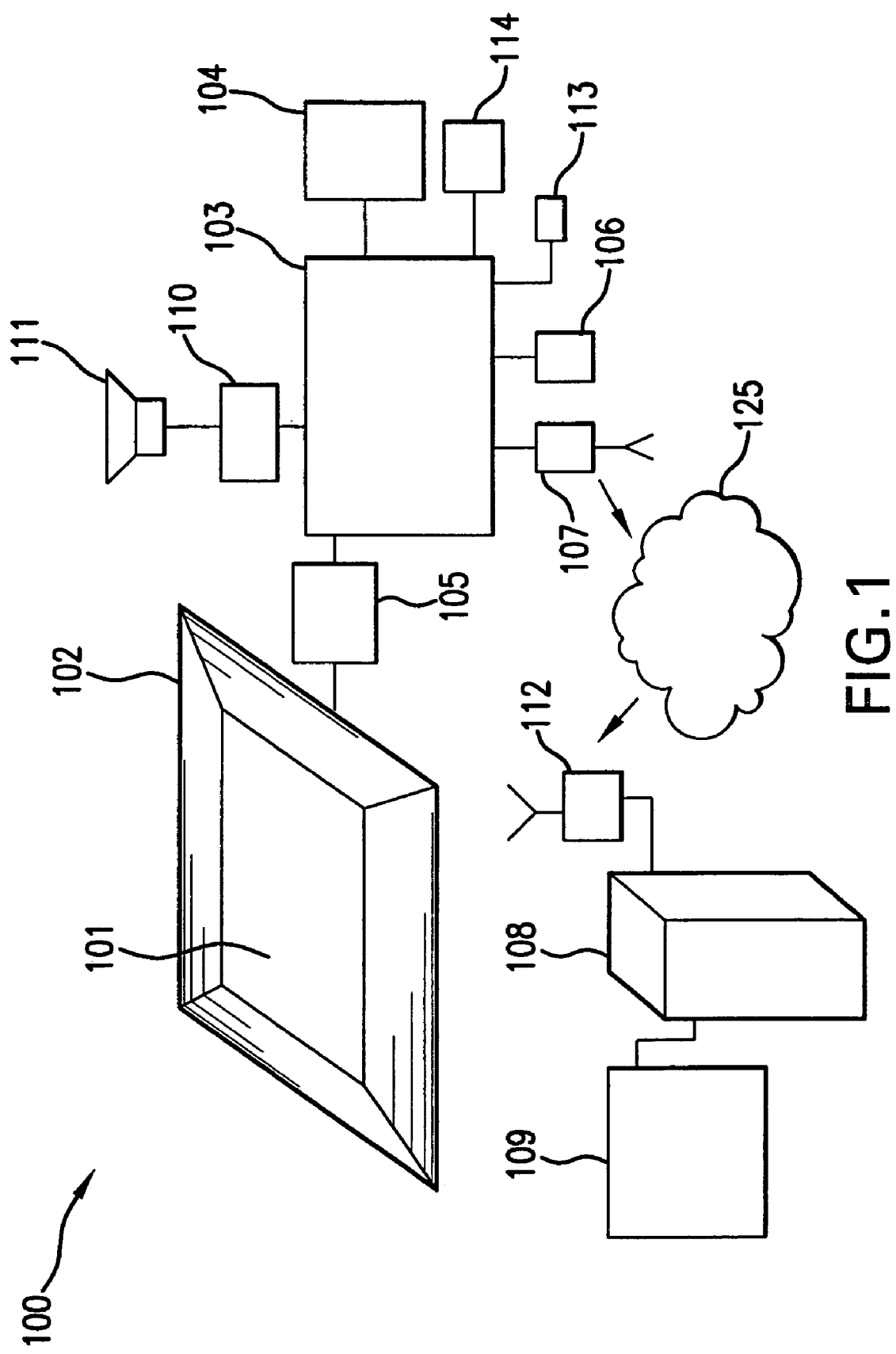
FIG. 1 shows a floor display system according to embodiments of the present invention.

Embodiments of the present invention relate to a floor display system with interactive features. The floor display system may be arranged in a public place, such as a commercial establishment or other public building, and be configured to display electronically modifiable arbitrary content, such as advertising or other informational content. In embodiments, the floor display system may be configured to detect an indication of the presence or activity of a person in the vicinity, and upon detecting the indication, perform a corresponding action in response. For example, upon detecting the indication of the presence of a person, the floor display system may generate a predetermined display in response. The floor display system may further produce some predetermined audio output in response to detecting a person. These and other advantageous embodiments of the present invention are described in more detail in the following.

As noted above, U.S. Pat. No. 6,417,778 discloses a system for electronically conveying information via a floor display. More specifically, the floor display may incorporate a modifiable electronic display surface presenting for example, a liquid crystal display. The display could be connected to a computer and a computer generated image could be displayed on the display. Thus, the image displayed on the display could be modified by generating a different computer image and displaying that computer image on the display. The display could be associated with a base portion of a floor covering, such as included within a recess thereof, or could be included on a bottom surface, facing upward, of an insert portion of the floor covering. Alternatively, the display could be integrally formed with either of the base portion or the insert portion. The modifiable display could utilize a plurality of different graphics that can be displayed in any of a variety of manners on the display. For example, the graphics could be displayed in a generally fixed position on the display or could scroll across the display, with both exemplary methodologies displaying multiple graphics either individually or in combination.

Other alternatives for modifying graphics displayed on the floor covering include using light emitting polymers to create, and thus change, the graphics. The light emitting polymers can be either applied to, attached to, or woven into the floor covering. The light emitting polymers may be utilized on any portion of floor covering, for example, on either the base portion or the insert portion, or on any other portion of the different embodiments for the floor covering. Light emitting polymers are known and described in U.S. Pat. Nos. 5,945,502, 5,869,350, and 5,571,626, which are incorporated herein by reference in their entirety.

Other options for a display are to use electronic ink or electric paper. Electric paper is available from Xerox and is described in U.S. Pat. Nos. 5,723,204, 5,604,027, 4,126,854, and 4,143,103, which are incorporated herein by reference in their entirety. Electric paper employs thousands of tiny, electrically charged beads, called Gyricon, each about the width of a human hair, to create pixels. The two-tone beads are embedded inside a liquid-filled plastic sheeting that forms the surface of the paper. Each bead, half-black, half-white, gyrates in response to an electric field. Whether the beads are black- or white-side up determines the image. Because there's no need to refresh the image, and because the screen isn't backlit, electric paper uses only a fraction of the power used by conventional electronic displays. Electromagnetic styluses and printer-like devices can be used for getting images onto the paper.

Electronic ink is available from E Ink Corp., at 45 Spinelli Pl., Cambridge, Mass. 02138. Electronic ink uses a microencapsulated micromechanical display system. Tiny microcapsules are captured between two sheets of plastic to create pixels. Alternatively, the capsules may be sprayed on a surface. The result is a flexible display material. The tiny capsules are transparent and contain a mixture of dark ink and white paint chips. An electric charge is passed through the capsules. Depending on the electrostatic charge, the paint chips float at the top or rest on the bottom of each capsule. When the paint chips float at the top, the surface appears white. When they rest at the bottom, and thus under the ink, the surface appears black. Each of the two states is stable: black or white. A transparent electromagnetic grid laid over the sheet's surface controls the shape of the image. The display may be wirelessly connected to, for example, a computer and thus, the World Wide Web by utilizing, for example, a Motorola paging system. Text on all displays, if multiple displays are used, can be changed at once by a single editor, through a Web page.

According to embodiments of the present invention, additional or alternative technologies to those described above may be used to implement a floor display system. A floor display system 100 according to embodiments of the present invention is shown in FIG. 1. The floor display system 100 includes an electronic display device 101 associated with a floor covering 102. More specifically, the display device 101 may be at least partly connected to, supported by, received within or otherwise associated with the floor covering 102. The floor covering 102 and associated electronic display device 101 may take many structural forms and be constructed from various types of materials, and are not limited to the specific forms illustrated herein. In embodiments, the floor covering 102 and electronic display device 101 are designed to be used in places where there is foot traffic or other (for example, wheeled shopping cart) traffic. Accordingly, the floor covering and electronic display device may be sturdy and durable enough that they may be repeatedly stepped on, walked over, or have a wheeled shopping cart or other rolling or sliding object traverse them, with negligible adverse effect on the floor covering and display device. The electronic display device may have, for example, a sturdy protective covering that is transparent or semi-transparent to allow the electronic display device to be viewed therethrough, and that protects the electronic display device from damage associated with foot or other traffic, such as scratches, cracks, chips, tears, or damage caused by environmental dirt. The floor covering 102 may be affixed to a floor or may be portable so that it can be easily moved to different places.

FIGS. 2A and 2B are a top or plan view, and a side orthogonal or elevation view, respectively, of the floor covering 102. As shown in FIGS. 2A and 2B, the floor covering 102 could comprise at least one inclined surface. More specifically, the floor covering 102 could comprise a plurality of inclined surfaces 212, 213, 214 and 215 that slope downward and away from a top surface 200 (which could be the surface of a protective covering of the display device 101, as described above) so that the entire perimeter of the floor covering presents an inclined surface to a person approaching the floor covering. Such a structure may make the floor covering easier to cross over, either by a person walking over the floor covering, or by a wheeled shopping cart, for example, if the floor covering is placed in the aisles of a commercial establishment. According to embodiments, at least a portion of the display device 101 could be arranged to be coplanar with one or more of the inclined surfaces of the floor covering. This could make a display of the display device easier to view for a person at a distance from or approaching the floor covering, since the display would be slightly elevated.

Figure 2C:
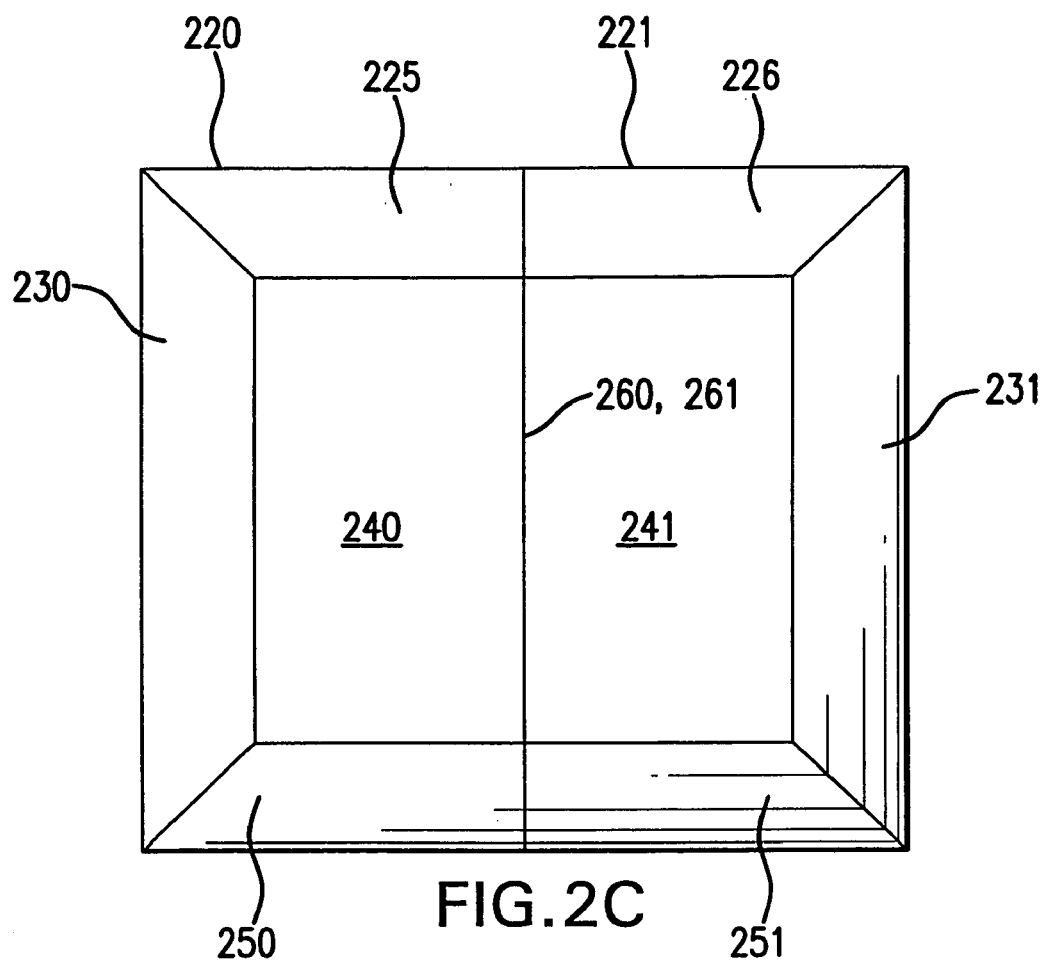
Figure 2D:
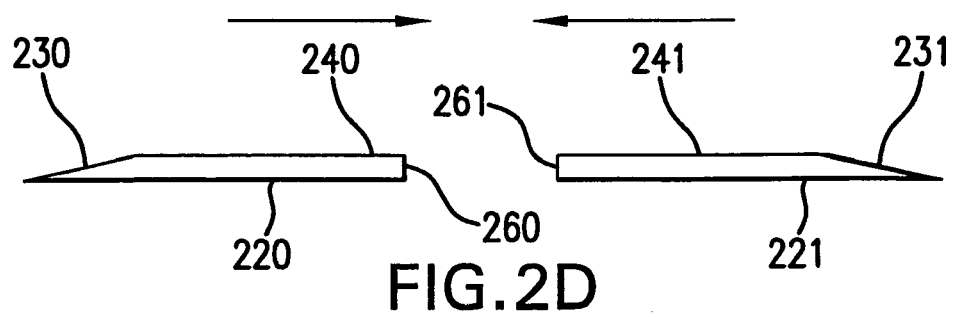
Figure 2E:
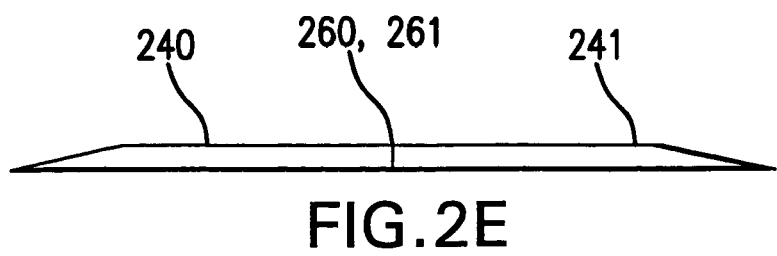

FIGS. 2C–2E show one alternative way of implementing a floor covering according to embodiments of the invention. A two-part structure is illustrated in FIGS. 2C–2E. The two-part structure comprises separate, substantially identical components 220 and 221. Component 220 has a top surface 240 and inclined surfaces 225, 230 and 250. Component 221 has a top surface 241 and inclined surfaces 226, 231 and 251. Each component 220, 221 could be used independently in a floor display system However, as shown in FIGS. 2D and 2E, the two components may be joined along respective edges 260, 261 thereof to form a composite structure having inclined surfaces all around its perimeter, to facilitate crossing over the composite structure more easily.

Referring now to FIG. 1, the electronic display device 101 associated with the floor covering 102 may be configured to electronically display graphical images and alphanumeric data in either a static (not moving or changing) or dynamic (e.g., scrolling or otherwise moving or changing) format. More specifically, the electronic display device 101 may be coupled by wired or wireless means to a controller 103 and modifiable via the controller 103 to display any content chosen by a user. For example, as shown in FIG. 1, the electronic display device 101 may be coupled to the controller 103 via a display driver circuit such as a video graphics adapter card 105. The controller 103 may include any kind of electronic logic circuit, for example, a general microprocessor configurable with software, or an ASIC (application specific integrated circuit). The driver 105 of the electronic display device may be integrated with the controller 103 or built into an ASIC. The controller may also be in the form of a single board computer with a processor and memory and with one or more display driving circuit built onto the board, as well as wireless components for communicating with the outside world or for loading data into memory.

The controller may be coupled to a storage medium 104, which could be any form of medium suitable for storing digital data, including RAM (random access memory), ROM (read-only memory), flash or other non-volatile solid-state electronic storage, EEPROM (electronically erasable and programmable read only memory), or magnetic and/or optical disk storage. The storage medium 104 may store, for example, control software for execution by the controller 103 and video content of choice for display, under the control of the control software, on the electronic display 101. A user interface (not shown), such as a personal computer with a display monitor and keyboard, may be coupled to the controller to enable configuration of the controller with specific user input, such as specific control programs to produce specific displays and/or audio output. An audio device 111, such as a loudspeaker, may further be coupled to the controller 103 via a sound card 110. The audio device 111 may output audio content of choice, stored in the storage medium 104, under the control of the controller 103. Components of the floor display system 100 may be powered by a power supply 114. The floor display system may further comprise a sensing device 113 to provide for a variety of interactive applications of the floor display system, as described in more detail below. The sensing device 113 could be coupled to the controller 103 and provide signals thereto. The connection of the sensing device to the controller could be wired or wireless.

Data may be stored in the storage medium 104 using, for example, a data port 106 coupled to a common system bus. The bus could be, by way of example only, a USB (Universal Serial Bus). The floor display system may further comprise a wireless port 107 implemented, for example, using a wireless WAN/LAN card. Through the wireless port 107, the floor display system 100 may be coupled to and communicate with a network 125. The network could be any kind of network, including a wide area network (WAN) such as the Internet, or a local area network (LAN) including, for example, other floor display systems. Through the network 125, the floor display system 100 may be coupled, for example, via a wireless communication device 112, to a server computer 108 of the network. The server computer 108 may be coupled to a database 109. The database 109 may store information relevant to operation of the floor display system 100. For example, the database may contain video and audio content or control software that is downloadable to the storage medium 104 of the floor display system. Thus, the floor display system 100 may be remotely controllable. However, the floor display system 100 need not be networked, and could be controlled locally by, for example, downloading content and control software locally via data port 106. Also, while wireless communication methods and systems are illustrated in FIG. 1, wired systems could also be used, or could be combined with wireless systems.

Display technologies that may be utilized in embodiments of the present invention, in addition to those described earlier, include: light-emitting diodes (LEDs), organic light-emitting diodes (OLEDs), electroluminescent (EL) displays, plasma display panels (PDPs), field emission displays, and ferroelectric displays (FEDs). Other display technologies that may be utilized in embodiments include optical fiber technology, where a remote image is formed electronically and transmitted utilizing a light guiding source to fiber arrays or bundles. The remote image light source could be internal or external to the floor covering. Other contemplated display technologies include holographic displays. In this technique, either a white-light or laser hologram may generated either internally or externally to the floor covering 102, and focused by a lens, possibly a Fresnel lens, to make it visible to persons viewing the display 101 at an acute angle.

According to embodiments, components of the floor display system 100 as described above could be housed completely internally to the floor covering 102, completely externally to the floor covering 102, or some components could be internal to the floor covering 102, while others are external.

As noted earlier, the floor display system may include a power supply 114. Power may be supplied to the floor display system by way of plugging into a power outlet in a wall through a cord, or through the use of batteries. The batteries used could be non-rechargeable or rechargeable. Other possible methods of delivering power to the floor display system include using photoelectric cells that convert ambient light into electricity that can be stored in a battery or used to power the display system directly. The photoelectric cells could be contained, for example, in the floor covering, or remotely connected to the display through a power cord.

Another method for powering the floor display system 100 could be, for example, through means whereby the pressure of walkers treading on the floor covering and associated display device was converted from mechanical energy to electrical energy. This could be, by way of example only, through some form of piezoelectric generator or other similar means. Alternatively, the vibrations in the floor from nearby machinery or passersby could also supply needed mechanical energy for electrical conversion to the display system.

As noted above, a wireless connection from a computer and/or network, such as the World Wide Web, could be used to transmit image content to a floor display system. Wireless connections between a computer or other processor, and control electronics of floor display system, could be implemented in many different technologies. One common technology today is wireless Ethernet, where one processor or computer communicates through an r-f or infrared (IR) signal to another. However, a wireless communication link can be established through a number of technologies and network protocols.

Wireless links can be ultrasonic, optical lightwave (IR, visible, ultraviolet), lasercomm, radio frequency, teraHertz, microwave, electromagnetic, inductively coupled, electrostatic or any other form of propagating electromagnetic energy between the transmitter and receiver. In addition to Ethernet, network protocols can be token ring, Bluetooth modem, cellular and PCS connections, or any other type of wireless LAN or WAN. The mode of data transfer can include time division, frequency division, or code division, and can also be multiple access or spread spectrum. One mode of wireless transmission that is well-suited for contemplated applications of floor display systems is the Ultra-Wide Band (UWB) mode of transmission. Contemplated commercial applications of floor display systems include use in electronically noisy environments such as, by way of example only: grocery stores, department stores, appliance stores, industrial facilities, restaurants, hotels, airports, apartments and residential housing. Ultra-Wide Band (UWB) transmission works well in these types of environments, among other reasons because when other electronically noisy sources such as machinery, remote door openers, bar-code readers, other r-f, TV, low-band transmissions are present, UWB allows high-speed data communications with low power spectral density over a wide spectral range (typically 3–10 gigaHertz). UWB also eliminates small-scale fading for arbitrary antenna position or orientation, which may be very useful for a display positioned on the floor. UWB also is more effective against the deleterious effects of multipath induced fading that is typical of more narrow-band wireless techniques.

Wireless communications may also include other techniques, either known today or in the future, which may be useful in communicating with and controlling a floor display system. For example, the wireless communications could be compatible with WiFi standards.

As noted above, the electronic display device 101 is capable of displaying at least alphanumeric data and graphic images. The content may include alphanumeric data alone, graphic images (e.g., pictures) alone, or combinations of the two, either static, moving, or both static and moving, in accordance with selected video content. Moving alphanumeric data and images may, for example, be scrolled. The alphanumeric data and graphic images could be black and white or in full color. Further, the display device 101 may include more than one distinct display: that is, the display area of the display device could be partitioned with respect to content. For example, the display area could include two or more different "windows," each displaying different content. Such a partitioning of displays is well known, for example, in "split-screen" TV and through the widespread use of various graphics software applications, including the ubiquitous "Windows" software by Microsoft®.

Figure 3:
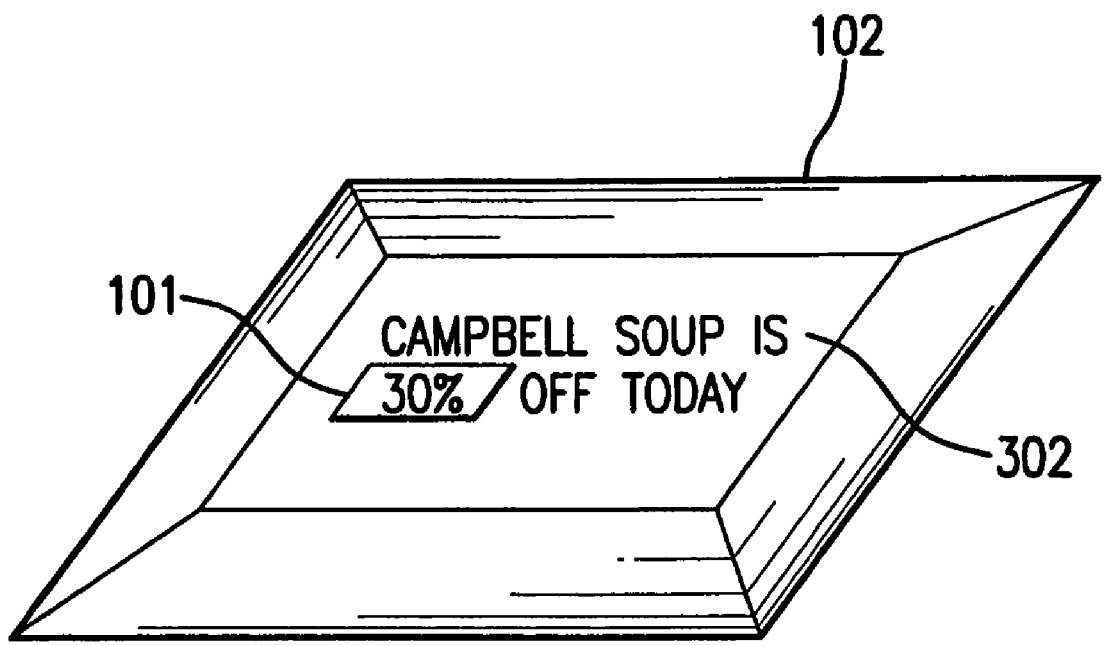
FIG. 3 shows a floor covering comprising a "mixed-medium" display including a fixed, non-electronic portion and a dynamic electronic portion.

FIG. 3 shows one possible arrangement of the electronic display device 101 according to embodiments. In FIG. 3, the electronic display device 101 is a dynamic portion of a "mixed-medium" display. The display in FIG. 3 is a mixed-medium display because part of an overall display presented by an upper exposed surface of the floor covering 102 is electronic, while another part is not. In FIG. 3, a non-electronic fixed or static portion 302 of a display is combined with a dynamic or changeable electronic portion 101. However, it is noted that "static" as used herein should not be equated with "non-electronic." In the example, the fixed portion reads "CAMPBELL SOUP IS OFF TODAY". The fixed portion could be, for example, printed on the upper exposed surface of a material of the floor covering 102. The dynamic portion may implemented by an electronic display device 101 housed in the floor covering, and utilizing one or more of the display technologies described above. The dynamic portion could be modifiable electronically to display arbitrary content as described above. For example, the dynamic portion could display information related to a sale price on an item, such as "30%" or "40 cents". Thus, in FIG. 2, the overall floor display would show "CAMPBELL SOUP IS 30% OFF TODAY", or "CAMPBELL SOUP IS 40 CENTS OFF TODAY". By utilizing such a combination of a static portion and a dynamic portion message, it is possible to significantly reduce the size of the electronic portion of the display, thus reducing costs. Further, by designing and engineering the dynamic portion of the display to both dynamically change a message either by way of scrolling or blinking, and also to flash or blink a light located within the display to draw attention to the display, it is possible to significantly increase awareness of the display by persons in the vicinity.

As discussed above, embodiments of the floor display system according to the present invention provide for interactivity with persons in the vicinity of the floor display system. In particular, sensing device 113 may take on a number of varying forms, each of which enables the detection of phenomena or activities indicating the presence of persons in the vicinity of the floor display system, and causes the floor display system to perform some corresponding action in response. In one such embodiment, the sensing device 113 is a sound-sensing device. The sound-sensing device 113 may be located within the floor covering 102, or may be located at some distance from the floor covering. The sound-sensing device could be configured to detect an individual as he or she approached the floor display system, and to cause a corresponding response to be generated by the floor display system. For example, the sound-sensing device could be coupled via a wired or wireless connection to the floor display system, and be configured to send a signal via the connection to the controller 103 to activate the display device 101 upon the detection of sound waves indicating the approach of a person. Upon receiving the signal, controller 103 could cause the display device 101 to generate a predetermined display of any desired content: for example, the displayed content could announce a sale, or advertise a product. The content could relate to products on nearby shelves. The floor display system could also be configured to generate a predetermined audio output of any desired content in response to a signal from the sound-sensing device. In view of the foregoing, the floor display system may operate in an active mode, i.e., a mode in which the system is actively generating some display and/or audio output, and a dormant or quiescent mode in which it is not actively generating some display and/or audio output. This quiescent mode may be entered when persons are not detected in the vicinity, in order to conserve power. The floor display system may alternate between the active mode and the quiescent mode accordingly to some programmed schedule, or may enter the active mode in response to some signal as described above.

The sound-sensing device could be adjustable to detect only predetermined frequencies of sound, and send an activation signal to the display system in response thereto. More particularly, the sound-sensing device could be either an omni-directional or a directional microphone depending up how noisy the general environment is. An omni-directional microphone has a constant sensitivity regardless of the direction from which sound is coming, and thus would be effective in a quiet environment to detect someone approaching from any direction. The omni-directional microphone could be implemented as one or more small electret microphones placed within or embedded in the floor covering. While electret microphones are one example, dynamic and condenser microphones could also be used. Commercially available omni-directional microphones include, by way of example only, Audio Technica MT830R, DPA Type 4060, and MMC4041.

In noisy environments, or if there is a particular direction from which the approach of a person is to be detected, a directional microphone may be preferable. A directional microphone is a microphone with a well-defined directional response, and is therefore better able than an omni-directional microphone to filter through sounds coming from a particular direction, while blocking out random environmental noise. Examples of commercially available directional microphones that could be utilized include cardioid microphones, super cardioid microphones, and shotgun microphones. Examples of cardioid microphones include the DPA® Type 4021, the Earthworks ® A30X, and the Shure® SM57. Examples of super-cardioid microphones include the Peavey ® PVM 480 and the Electrovoice ® ND767A. Examples of shotgun microphones include the Beyerdynamic® MCE86 S.1, the Sennheizer® K6 ME-66, and the Shure® SM89. Depending upon how noisy the environment in which the microphone was used, a microphone with greater directional sensitivity might yield better results than a microphone with lesser directional sensitivity. For example, in a very noisy environment, a microphone with high directional sensitivity, such as a super-cardioid or shotgun could be preferable.

In yet another embodiment providing for interactivity, the sensing device 113 may be a motion-detection device. The motion-detection device 113 could be located within the floor covering 102, or may be located at some distance from the floor covering, for example, in or on a ceiling or wall near the floor covering. The motion-detection device could be configured to detect an individual as he or she approached the floor display system, and to cause a corresponding response to be generated. For example, the motion-detection device could be coupled via a wired or wireless connection to the floor display system and be configured to send a signal via the connection to activate the display device 101 upon the detection of motion indicating the approach of a person.

The display device 101 could generate some desired display upon activation; the floor display system could also generate corresponding audio output. The motion detection device could be adjustable, so that it only detects motion that is within a certain area or perimeter around the display. The motion-detection device could also be directionally sensitive, so that, for example, only customers entering an establishment would trigger the motion-detection device and corresponding display. Motion-detection devices that could be used in association with the display include, by way of example only, motion detection devices that utilize IR technology, simple radar, or a light beam.

There are many different ways to implement a motion-detection device 113, including using active motion detection and passive motion detection. Active motion detection systems typically inject energy (e.g., light, microwaves or sound) into the environment, and then detect a change in the energy. For example, it is common for stores to have a device that emits a beam of light that crosses a space near the entry way of the store, and a corresponding photosensor opposite the beam to measure an amount of incident light generated by the beam. When a customer moves across the beam, thus interrupting it, the photosensor detects the change in the amount of incident light and may sound an audible alarm, such as ringing a bell. A detection system of this kind could be used to signal the floor display system that a person is approaching. Similarly, many grocery stores have automatic door openers that use a very simple form of radar to detect when someone passes near the door. Such systems may use an emitter/receiver device arranged above the door. The emitter portion sends out a burst of microwave radio energy and waits for the reflected energy to bounce back and be detected by the receiver portion. When a person moves into the field of microwave energy, it changes the amount of reflected energy or the time it takes for the reflection to arrive at the receiver portion, and accordingly the emitter/receiver device generates a signal that causes the door to be automatically opened. A similar operation can be performed by using ultrasonic sound waves: i.e., bouncing them off a target and waiting for the echo, and performing some predetermined action based on the echo.

Passive motion detection systems include systems that detect infrared energy to detect motion. Such systems may include sensors known as PIR (Passive InfraRed) sensors or pyroelectric sensors. PIR or pyroelectric sensors may be used, for example, in security systems designed to be sensitive to the temperature of a human being. Humans have a skin temperature of approximately 93 degrees F., and radiate infrared energy with a wavelength between 9 and 10 micrometers. Therefore the sensors are typically sensitive in the range of 8 to 12 micrometers of wavelength. The sensors are typically simple electronic components not unlike photosensors. The infrared energy radiated from a source bumps electrons off a substrate of the PIR or pyroelectric sensors, and these electrons can be detected and amplified into an electrical signal that may be used to activate some predetermined operation. When a person walks by a sensor, the amount of infrared energy in the "field of view" of the sensor changes rapidly and is easily detected. It is the sudden change that is used to detect motion. PIR or pyroelectric sensor could be configured to have a wide or narrow field of view. A wide field of view can be created, for example, by placing a lens over the sensor. A narrow field of view can be achieved by using a sensor without a lens; the field of view can be made even more narrow by placing the sensor in a recess or inside a box or tube that is open in the direction from which motion is desired to be detected. The floor display system of the present invention could use any of the above system and methods, or combinations thereof, or systems and methods not disclosed herein, to implement a motion-detection device 113.

The floor display system according to embodiments of the present invention may also be made interactive by detecting the presence or movement of a person based on other events within the physical environment. For example, the floor display system could be coupled via a wired or wireless connection to a door in an entry way or other door of a commercial establishment or other building. Through the connection, the floor display system could detect the opening of the door, and activate the display in response.

Figure 4:
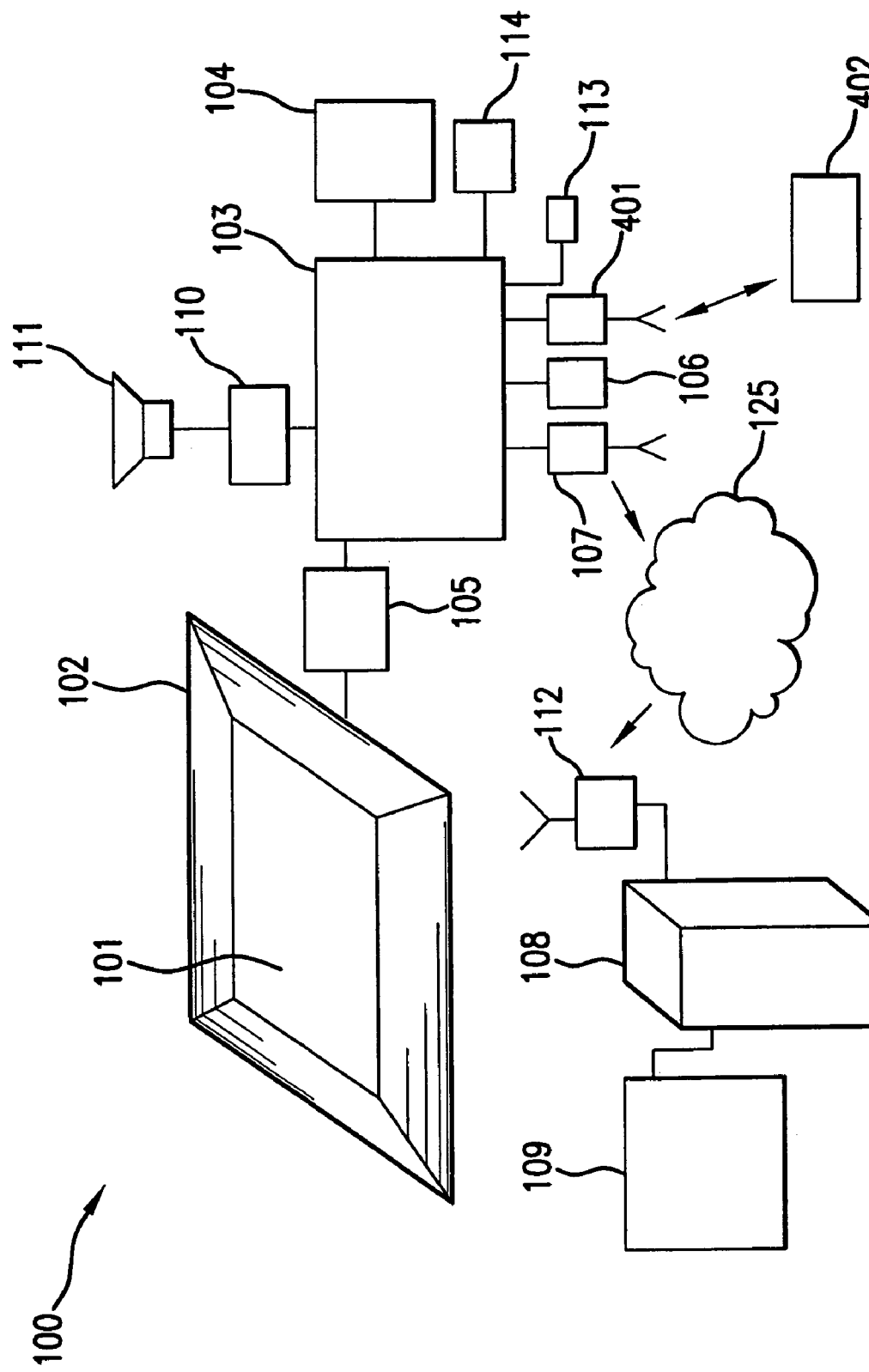
FIG. 4 shows a floor display system including a contact-less mechanism for obtaining identity information from an identity device, and also relates to other embodiments further described in the detailed description below.

In still further embodiments providing for interactivity, a floor display system in a commercial establishment could display information customized to a particular individual. Such embodiments could comprise mechanisms for automatically determining a person's identity. For example, as shown in FIG. 4, a floor display system 100 according to embodiments of the invention could further comprise a contact-less input device 401 capable of receiving identification information from an identity device 402 carried by the person. The contact-less input device 401 may be, for example, a wireless port comprising a receiver and an antenna configured to receive and process wireless electromagnetic signals containing identity information emitted by the identity device 402. The identity information obtained from the identity device 402 could be supplied by the wireless port 401 to the controller 103, which could then access a database, such as database 109, to obtain information relevant to the person based on the identity information. Such relevant information may include, but is not limited to: name, age, history of purchases, frequency of store visits, most commonly purchased items, etc. Based on the relevant information, the floor display system could be caused to display information specifically relating to or directed to the person. By way of example only, the display could include a personal greeting. Additionally, the controller of the floor display system could cross-reference the purchase history of the person with the sales or promotional items that are currently available in the commercial establishment. Based on the person's purchase history, the floor display system could display information notifying the person that a certain item potentially of interest to the person is on sale, and display the aisle location of the item. In addition, the floor display system could generate a coupon for the item, thus further encouraging the person to purchase the item.

An example of an identity device 402 that could be used with the contact-less input device 401 is known as a "contact-less" card. Contact-less cards do not require physical application by a person to a reading device. Contact-less cards may have an antenna coil and a chip embedded in the card and be configured to output information in the form of wireless electromagnetic signals. Identity information on this type of card may be obtained when the card passes within a predetermined range of a reading device including a receiver and antenna adapted to receive and process signals output by the card, such as the contact-less input device 401 illustrated in FIG. 4.

Contact-less cards as described above may, according to some, fall under the general category of "smart" cards. Smart cards (or electronic cards) are known devices that typically contain an embedded computer chip and are typically the size of a conventional credit or debit card. The chip typically contains a microprocessor and memory, which may hold an operating system and application data that may be protected by state-of-the-art security features. Several types of smart card technologies are available in today's marketplace. One example is a memory card. A memory card contains a memory chip and is similar to a small floppy disk. This type of (memory) chip can store identity information as well as other kinds of information, such as a store credit amount.

In other embodiments, cards known as microprocessor cards could be used to provide individual identification for purposes of customized displays. Microprocessor cards contain a microprocessor chip that can add, delete, change, and update information. A microprocessor card may further comprise an input/output port, operating system and hard disk, and is thus viewed by many as essentially a miniature computer.

Identification cards such as the smart cards, memory cards and microprocessor cards described above need not be read by a contact-less mechanism as described in FIG. 4. Instead, for example, they could be read or scanned by physical application of the card by a person to a reading device located in a convenient place in the commercial establishment. The reading device may be coupled to, or a component of, an identification system. The identification system could, for example, be implemented in a computer 108 and database 109, coupled to the floor display system of the present invention. The identity information obtained by the identification system could then be communicated to the floor display system.

Some types of cards that specifically require physical application by a person to a reading device could also be used with the floor display system of the present invention. Such cards are known as "contact" cards. Contact cards may have a gold chip embedded in the card. This kind of card requires insertion into a smart card reader and a direct connection with the physical contact points on the card to transmit data. Contact cards are used frequently in banking, communications, health care and loyalty (such as storing automotive service histories) applications.

Cards known as hybrid/twin cards could also be used to provide identification of a person to a floor display system. These cards have two chips embedded in them: a contact-less chip and a contact chip. The two chips are typically not connected to each other. Instead, typically one chip serves the consumer needs and the other the card issuer needs. In yet other embodiments, combination cards could be used. These cards are also known as dual-interface cards, and they contain one chip that is designed to support both contact and contact-less readers.

Using technology along the lines described above, further embodiments of the present invention could be configured to track movements of persons in a commercial establishment or other public place. In such embodiments, persons could carry identification cards readable by a contact-less mechanism as described above. A plurality of floor display systems equipped with contact-less detection mechanisms could be arranged in predetermined locations in the establishment, and track the movements of persons by detecting the identification cards. The cards could be personalized (i.e., identify an individual) as described above, or could be generic, and, for example, attached to a shopping cart or basket. Information detailing the movements detected by the floor display systems could be recorded in a database, and used by merchants to, for example, help optimize the layout of a store, help identify where to place impulse-buy items, and the like. Examples of technologies that may be utilized to track persons carrying or otherwise transporting contact-less identification devices include Blue Tooth technology, IRDA, r-f link, or any other local area network technique to link the floor display systems.

As is well known, some commercial establishments (e.g., Wal-Mart and Target) and do-it-yourself stores (e.g., Home Depot and Lowes) are very large and contain a vast amount of merchandise. As a result, some individuals shopping in these stores have difficulty finding the item(s) they are looking for. Accordingly, floor display systems according to embodiments of the present invention may further provide for assisting a person in finding his or her way around a large commercial establishment and finding desired items.

According to such embodiments, upon entering the store, a shopper would either orally (for example, by using a microphone or other sound recording device) or manually (for example, using a keyboard, keypad, or touch monitor type device) enter a desired product or list of products into a machine. The machine would then produce a "trip ticket" detectable by a plurality of floor display systems arranged in predetermined locations throughout the store.

The trip ticket may be a device such as a "smart card" described above, capable of storing information such as the product list entered by the shopper. The information on the trip ticket may be readable via a contact-less technology as discussed in connection with various embodiments described above. Floor display systems distributed throughout the store may be equipped with contact-less technology for reading the trip tickets. As the shopper moves through the store and approaches the various floor display systems, the systems may detect and read the trip ticket. Upon detecting a trip ticket and reading a product list thereon, a floor display system may be configured to display the direction the shopper should walk to locate the desired product(s). Alternatively, the trip ticket might not actually store the product list itself. Instead, the product list or other information corresponding to an identifiable trip ticket could be stored in a database accessible by the floor display system, and retrieved upon detecting and identifying the trip ticket.

In still further embodiments of the present invention, detection of mobile phones may be provided. Social frictions have been occasioned by the increased use and rising popularity of mobile phones. In many situations, it is considered inappropriate and impolite to have a mobile phone ring and disturb nearby persons. Accordingly, embodiments of the present invention may include a mobile-phone-detection device, using a configuration as shown in FIG. 4, where the contact-less input device 401 is a mobile-phone-detection device. Devices that could be used to detect mobile phones include, for example, near-field RF detectors that can pick up a wide range of RF signals. Such devices are known, for example, for detecting illegal listening devices or "bugs". One commercially available example includes the MicroAlert™ system that is capable of detecting the presence of a mobile phone or any device emitting RF radiation. The mobile-phone-detection device 401 could be configured to send a signal to the controller 103 of the floor display system upon the detection of a mobile phone that was powered on. In response to the signal, the controller could cause a display to be generated comprising, for example, a message indicating that the powered-on mobile phone had been detected, and/or sound an alarm indicating that the mobile phone had been detected. Additionally, the floor display system could display a request that the mobile phone be powered off, or sound an audible request that the mobile phone be powered off. Embodiments of the present invention as described in the foregoing could find particularly beneficial application in such settings as, for example, the entrances of orchestra houses, venues for musicals or plays, movie theatres, or any other place where a ringing phone may be deemed inappropriate.

A floor display system according to other embodiments of the present invention could be used for security applications. Known security technology that is used in commercial establishments to prevent theft includes "Electronic Article Surveillance" technology to monitor the entrances/exits of an establishment. This technology involves using antennas that are placed on either side of a door opening. The antennas are coupled to other components of article surveillance technology. One antenna may act as a transmitter, and another as a receiver. A recognition device, which may comprise a tuned circuit including an inductor and capacitor, soft magnetic strips or wires, or vibrating resonators, may trigger detection by disturbing the transmission between the transmitting antenna and the receiving antenna when passing between them. Each protected item in the store may be tagged with a recognition device that can be detected by the antennas placed on either side of the store entrance/exit. The article surveillance technology recognizes protected items when they pass through the antennas, sounding an alarm to alert sales personnel of possible attempted theft.

Figure 5:
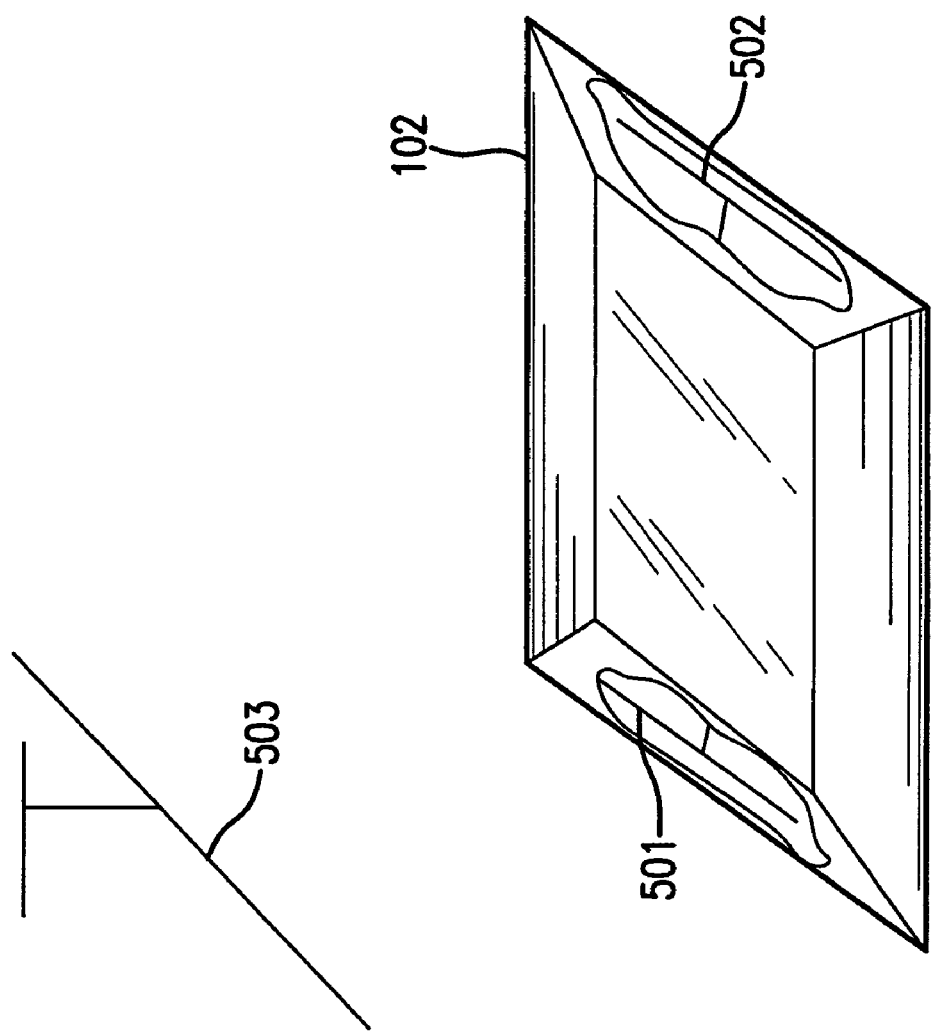
FIG. 5 shows a floor display system including security features.

Electronic article surveillance (EAS) technology as described in the foregoing could be incorporated into a floor display system according to embodiments of the present invention. In one configuration, shown in FIG. 5, for example, a floor covering 102 according to the present invention could include antennas 501 and 502 arranged along edges of the floor covering, to detect protected items tagged with recognition devices. The antennas could be coupled to other components of article surveillance technology, to enable protected items to be recognized. In order to detect possible theft of the protected items, a floor covering or plurality of floor coverings containing such antennas may be arranged on the floor near the entrance(s)/exit(s) to a store. Thus, as a person walks over a floor covering in an effort to exit the store with a protected item tagged with a recognition device, the recognition device may pass between or near the two antennas and therefore be sensed and recognized by the article surveillance technology. Upon detection of a protected item, the floor display system could be caused to display a visible alert or sound an audible alert. An electronic article surveillance system utilizing a floor display system according to embodiments of the invention could also be used, for example, with a third antenna 503. The third antenna could be the transmit antenna of the EAS device, while one or more antennas in the floor covering could be the receiver antenna(s). Alternatively the third antenna 503 could be an additional receiver antenna, where the floor cover includes both a receiver and transmitter antenna. The third antenna 503 could be arranged over the floor covering, for example, in or suspended from the ceiling. In embodiments, the floor covering may include only a single antenna that may cooperate with an overhead antenna.

Figure 6A:
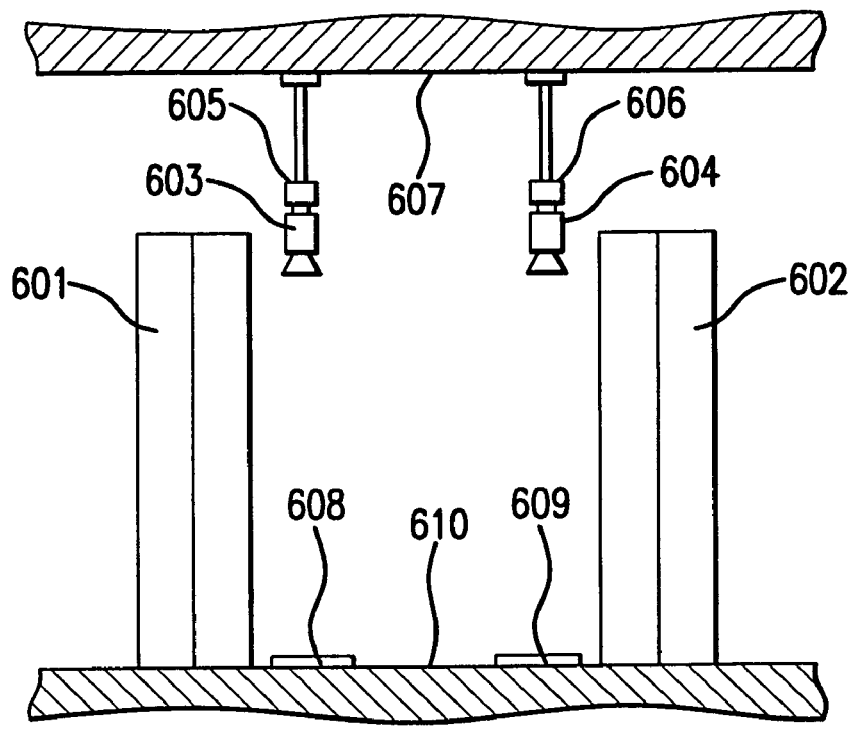
FIGS. 6A–6C show a floor display system wherein an image is projected by an image projection device onto a floor covering.
Figure 6B:
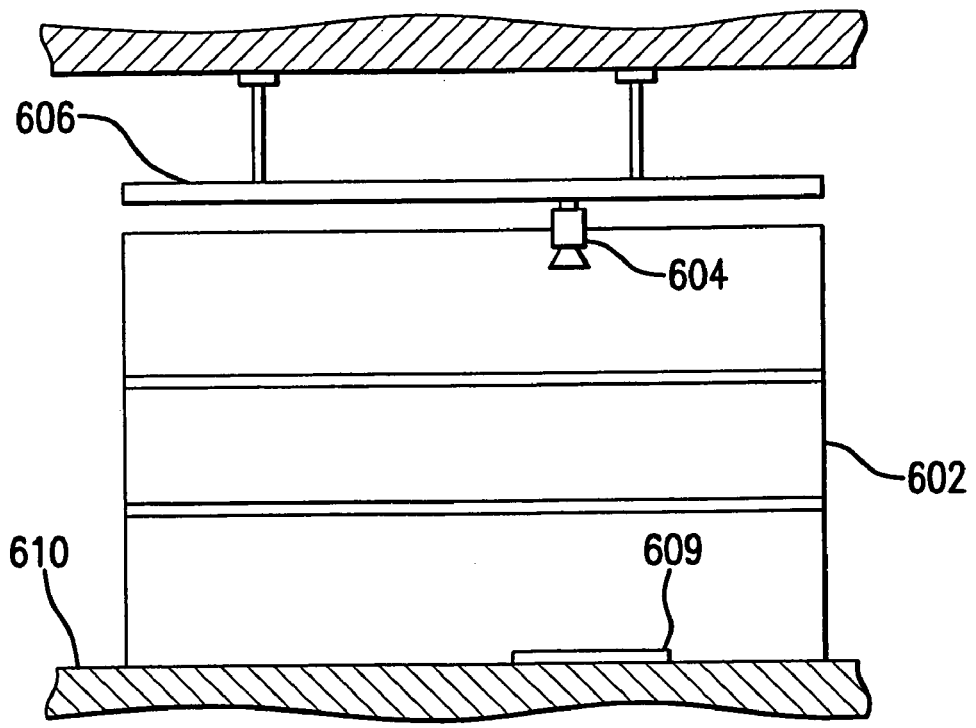

In yet further embodiments of the present invention, a floor covering may be used in combination with an image projection device. In such embodiments, the floor covering provides a surface onto which the projection device projects an image from a distance. FIGS. 6A and 6B illustrate a system for projecting an image onto a floor covering from a distance. Such a system could be used, for example, in the aisles of a commercial establishment such as a grocery store. Floor coverings 608 and 609 could be placed on a floor 610 adjacent to shelves 601, 602 of the commercial establishment. Projection devices 603, 604 could be movably attached to guidance members such as rail systems 605, 606 above the floor coverings. The rail systems could be, for example, attached to the ceiling. The image projection devices 603, 604 could be, by way of example only, electronic projectors similar to devices used with laptop computers for presentations, or other image projection devices comprising an optical system which allows an image to be focused onto a surface at a given distance. The floor coverings 608, 609 may have, for example, white or silvered surfaces to display the projected images.

Images projected onto the floor coverings could be configurable to include arbitrary content as described above, for example, by coupling the projection devices to components of a system as described in connection with FIG. 1. That is, the projection devices could be coupled to a controller, storage medium, network, and so on, to provide for control of the projection devices. For example, the projection devices could be configured to project, onto the floor coverings 608 and 609, graphic and alphanumeric information relating to products on the adjacent shelves 601, 602.

The projection devices could be movable along the rail systems. FIG. 6B illustrates a frontal view of the right shelf 602 and associated rail system 606, projection device 604 and floor covering 609. The projection device 604 could be movable along the rail system 606 either manually or automatically, for example, with a motorized pulley, chain, or slide system, which are well known in the automation industry. The projection device 604 could be moved, for example, to a location in front of an item on the shelf for which desired information will be displayed. A corresponding floor covering 609 could then be placed under the projection device 604 so that an image can be seen; by a person standing in front of and facing the shelf 602. The floor covering 609 could be either manually aligned with the projection device 604, or aligned automatically, for example, by using a photodiode and corresponding detector system. More specifically, more photodiodes could be provided in the floor covering, and the projection device could be provided with a photodiode detector to register correct alignment of the projection device with the floor covering. Of course a symmetrical configuration is possible wherein the detector diodes are in the floor covering and the transmit diodes reside on the projection device, and the floor covering sends a signal to the drive mechanism moving the projection device indicating it is in the correct position.

Figure 6C:
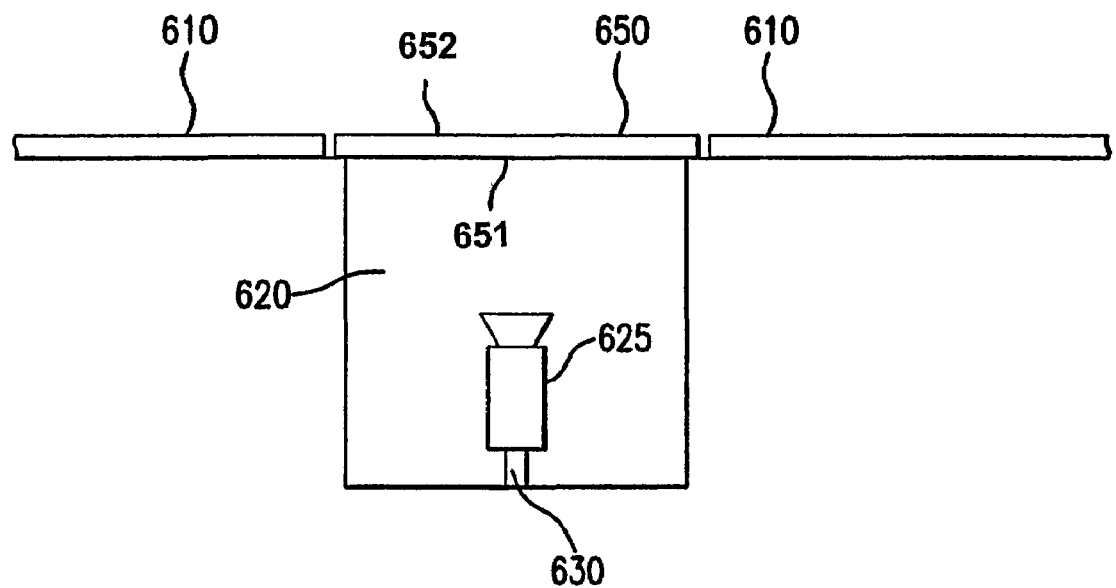

An alternative embodiment using a floor covering in combination with an image projection device is illustrated in FIG. 6C. As shown in FIG. 6C, according to embodiments an image projection device 625 may be provided in a recess 620 in a floor 610. A floor covering 650 may be arranged over the recess and provide a surface upon which images projected by the image projection device 625 could be displayed. Thus, in the embodiment of FIG. 6C, the floor covering 650 could be formed from a "transmissive" medium that allowed images projected onto its lower surface 651 to be seen on its upper surface 652. The image projection device could be movable along a rail 630.

Figure 7:
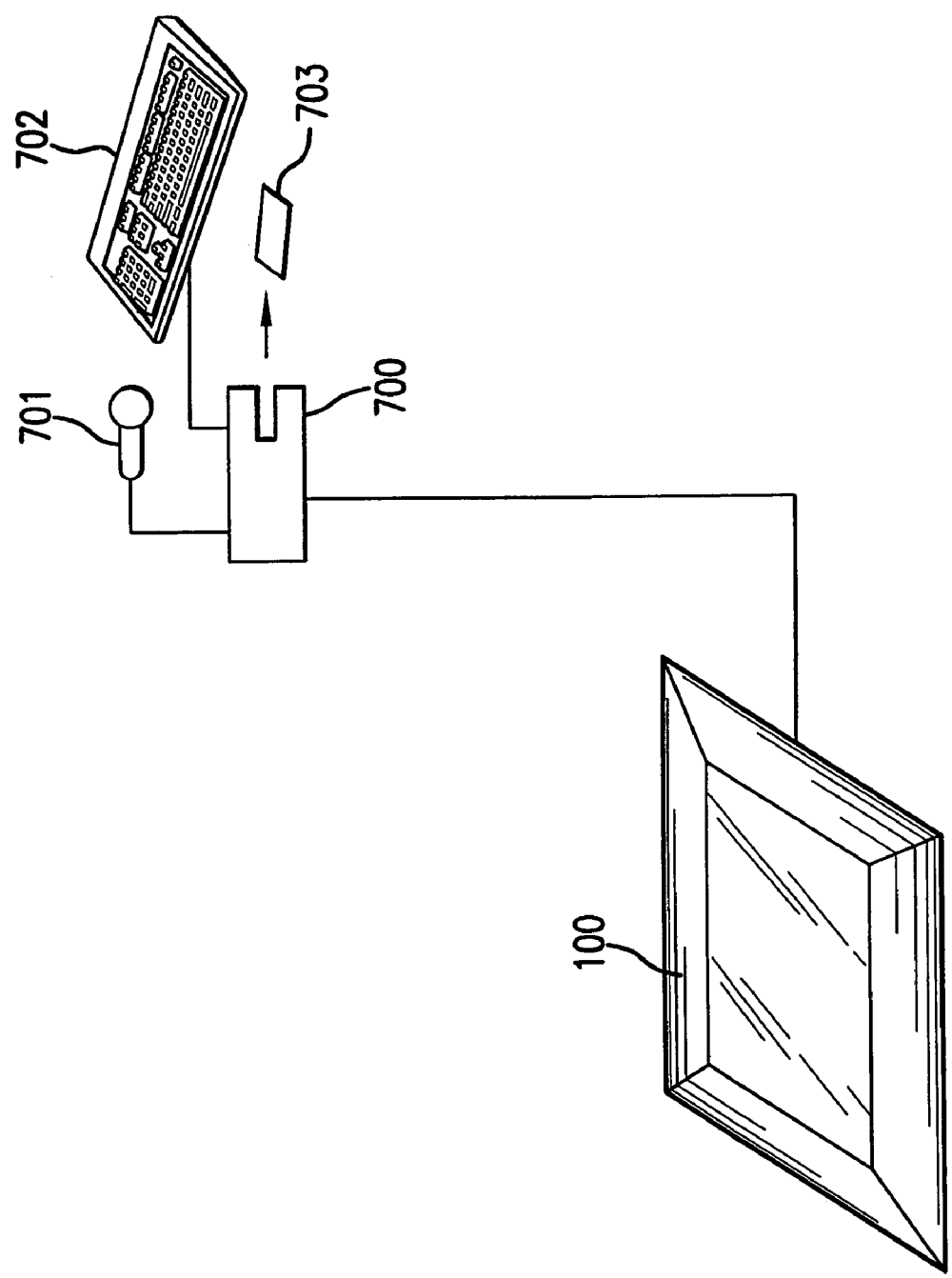
FIG. 7 shows a floor display system including a data input/output device for inputting desired items in a commercial establishment, and outputting a corresponding location.

FIG. 7 shows still another embodiment according to the present invention. As shown in FIG. 7, a floor display system 100 may be coupled to a data input/output device 700. The data input/output device may comprise a mechanism for a user, such as a store customer, to enter specific data for processing by the floor display system. For example, the data input/output device could include a speech input device 701, such as a microphone, and/or a keyboard 702 for entering alphanumeric data. The data input/output device may comprise a computer and software for performing speech recognition processing of utterances directed by a user into the speech input device 701. The data input/output device may further comprise a printer for generating printed output 703.

The floor display system 100 and data input/output device may be arranged in a convenient location in a commercial establishment. A customer visiting the establishment may approach the data input/output device, which may be arranged at a comfortable level for speaking or typing into. The customer may utter, for example, an item or list of items into the speech input device, or type the item or items into the keyboard. In response, the floor display system may display a corresponding output, such as an advertisement or advertisements for the items, and/or a location within the establishment of the items or items, and/or generate print output 703, such as a coupon or coupons for, or specifying the location of, the item or items.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A floor display system, comprising:
   an electronic display device associated with and in a plane substantially parallel to a floor;
   wherein the electronic display device is configurable to display an electronically modifiable verbal message.

2. The floor display system of claim 1, further comprising an audio device configurable to output electronically modifiable arbitrary audio content.

3. The floor display system of claim 1, further comprising a detection mechanism configured to detect an indication associated with a presence or activity of a person, and to cause the floor display system to perform a corresponding action in response.

4. The floor display system of claim 3, wherein the detection mechanism comprises a sound-sensing device.

5. The floor display of claim 4, wherein the sound-sensing device includes an omni-directional microphone.

6. The floor display of claim 4, wherein the sound-sensing device includes a directional microphone.

7. The floor display system of claim 3, wherein the detection mechanism comprises a motion-detection device.

8. The floor display of claim 7, wherein the motion-detection device uses active motion detection.

9. The floor display of claim 7, wherein the motion-detection device uses passive motion detection.

10. The floor display of claim 8, wherein the active motion detection includes using a device that radiates energy in combination with a device that detects the radiated energy.

11. The floor display system of claim 9, wherein the passive motion detection includes detecting infrared energy.

12. The floor display system of claim 3, wherein the action is generating a predetermined display.

13. The floor display system of claim 3, wherein the action is generating a predetermined audio output.

14. The floor display system of claim 3, wherein the detection mechanism comprises a contact-less input device configured to receive identity information from an identity device.

15. The floor display system of claim 14, wherein the identity device is a contact-less device.

16. The floor display system of claim 15, wherein said contact-less device is a smart card.

17. The floor display system of claim 14, wherein the floor display system is configured to generate a customized display relating to a specific person corresponding to the identity information.

18. The floor display system of claim 14, wherein the contact-less input device is configured to receive information from a trip ticket corresponding to at least one item within a commercial establishment.

19. The floor display system of claim 18, wherein the floor display system is configured to display a location of the at least one item within the commercial establishment.

20. The floor display system of claim 3, wherein the detection mechanism comprises a mobile-phone-detection device.

21. The floor display system of claim 20, wherein the detection mechanism includes a near-field RF detector.

22. The floor display system of claim 3, wherein the detection mechanism comprises a security device for detecting items within a commercial establishment to be protected from theft.

23. The floor display system of claim 22, wherein the security device comprises an antenna configured to detect an item tagged with a recognition device.

24. The floor display system of claim 3, wherein the detection mechanism comprises a contact input device configured to receive identity information from an identity device.

25. The floor display system of claim 24, wherein said identity device is a contact device.

26. The floor display system of claim 25, wherein said contact device is a smart card.

27. The floor display system of claim 1, wherein the electronic display device is configured to be repeatedly traversed by foot and wheeled traffic.

28. The floor display system of claim 27, further including at least one inclined surface to facilitate traversal of the electronic display device by the foot and wheeled traffic.

29. The floor display system of claim 27, further including inclined surfaces around an entire perimeter of the electronic display device, to facilitate traversal of the electronic display device by the foot and wheeled traffic.

30. The floor display system of claim 27, further including a two-part structure joinable along edges thereof to form a composite structure having inclined surfaces around its entire perimeter, to facilitate traversal of the composite structure by the foot and wheeled traffic.

31. The floor display system of claim 1, wherein the electronic display device forms a dynamic portion of a display that is combined with a static portion of the display.

32. The floor display system of claim 1, wherein the floor display system is included in a network.

33. The floor display system of claim 32, wherein the floor display system is wirelessly coupled to the network.

34. The floor display system of claim 33, wherein the wireless coupling uses an ultra-wide-band mode of transmission.

35. The floor display system of claim 32, wherein the floor display system has a wired connection to the network.

36. The floor display system of claim 1, wherein the electronic display device includes at least one of electronic ink, electronic paper, liquid crystal, light-emitting polymers, light-emitting diodes, organic light-emitting diodes, an electroluminescent display, a plasma display, a field emission display, a ferroelectric display, a fiber optic display, a holographic display, a micro-mechanical component, and a pixel.

37. The floor display system of claim 1, wherein the floor display system is powered by mechanical energy derived from traffic traversing a floor covering of the floor display system.

38. The floor display of claim 1, wherein the electronic display device is capable of displaying at least alphanumeric data and graphic images, either separately or in combination, and either static or moving, or both static and moving.

39. The floor display system of claim 1, wherein the floor display system is coupled to an identification system including a reading device configured to obtain identity information from an identity device by physical application of the identity device to the reading device, and wherein the floor display system is configured to generate a customized display relating to a specific person corresponding to the identity information.

40. The floor display system of claim 39, wherein the identity device is a smart card.

41. The floor display system of claim 1, further comprising a data input/output device configured to receive specific user input and generate a corresponding output.

42. The floor display system of claim 41, wherein the data input/output device includes a speech recognition device.

43. The floor display system of claim 41, wherein the data input/output device includes a keyboard.

44. The floor display system of claim 41, wherein the data input/output device includes a printer.

45. The floor display system of claim 41, wherein the corresponding output is a location of an item entered by a user.

46. The floor display system of claim 41, wherein the corresponding output is a coupon for an item entered by a user.

47. The floor display system of claim 1, wherein the electronic display device includes liquid crystal.

48. The floor display system of claim 1, wherein the electronic display device includes a light-emitting polymer.

49. The floor display system of claim 1, wherein the electronic display device includes an organic light-emitting diode.

50. The floor display system of claim 1, wherein the electronic display device includes a pixel.

51. A floor display system, comprising:
a floor covering; and
an image projection device configured to project electronically modifiable arbitrary image content onto the floor covering from a distance;
wherein the image projection device is movably attached to a guidance member to enable positioning of the image projection device in a desired location relative to the floor covering.

52. The floor display system of claim 43, wherein the floor covering comprises a white or silver color.

53. A floor display system, comprising:
a floor covering; and
an image projection device configured to project electronically modifiable arbitrary image content onto the floor covering from a distance;
wherein the image projection device is configured to be automatically aligned with the floor covering.

54. A floor display system, comprising:
a floor covering; and
an image projection device configured to project electronically modifiable arbitrary image content onto the floor covering from a distance;
wherein the image projection device is located in a recess in a floor, and the floor covering is arranged over the recess.

55. The floor display system of claim 54, wherein the floor covering comprises a transmissive medium.

56. An electronic display device associated with a floor, a display surface of the display device lying in a plane substantially adjacent and parallel to the floor, the surface facing upwardly from the floor, wherein the electronic display device is coupled to a controller capable of generating a changing verbal message on the display surface.

57. The electronic display device of claim 56, wherein the display device may be wirelessly coupled to the controller.

58. The electronic display device of claim 56, wherein the controller may be coupled to a network.

59. The electronic display device of claim 56, wherein the controller is associated with a detection mechanism to detect an indication of a presence or activity of a person, and is configured to cause the display device to generate a display in response to the indication.

60. An electronic display device associated with and in a plane substantially parallel to a floor, wherein the electronic display device is configurable to display an electronically modifiable verbal message.

61. An electronic display device associated with and in a plane substantially parallel to a floor, wherein the electronic display device is configurable to display both changing verbal content and changing graphical content.

62. A floor display system, comprising:
a targeted surface associated with a floor, the targeted surface being suitable for displaying an image projected thereon; and
an image projection device configured to project electronically modifiable alphanumeric content onto the targeted surface from a distance;
wherein the image projection device is movably attached to a guidance member to enable positioning of the image projection device in a desired location relative to the targeted surface associated with the floor.

63. The floor display system of claim 62, wherein the image projection device projects the image onto the targeted surface from above the surface.

64. The floor display system of claim 62, wherein said targeted surface is substantially parallel to a superior surface of the floor.

65. The floor display system of claim 62, wherein said targeted surface is substantially parallel to and slightly above a superior surface of the floor.

66. The floor display system of claim 62, wherein the targeted surface comprises a white or silver color.

67. A floor display system, comprising:
a targeted surface associated with a floor, the targeted surface being suitable for displaying an image projected thereon; and
an image projection device configured to project electronically modifiable alphanumeric content onto the targeted surface from a distance;
wherein the image projection device is configured to be automatically aligned with the targeted surface associated with the floor.

68. A floor display system, comprising:
- a targeted surface associated with a floor, the targeted surface being suitable for displaying an image projected thereon; and
- an image projection device configured to project electronically modifiable image content promoting a product that is for sale, the image content being projected onto the targeted surface in a proximity of the product being promoted;
- wherein the image projection device projects the image onto the targeted surface from below the surface.

69. The floor display system of claim 68, wherein said targeted surface is substantially parallel to a superior surface of the floor.

70. A floor display system comprising an electronic display device associated with and in a plane substantially parallel to a floor, the floor display system being associated with a data device wherein said data device communicates data in response to user input, the user input comprising one of alphanumeric data or speech.

71. The floor display system of claim 70 wherein said data being communicated is one of a coupon, an advertisement, or a location of an item.

72. A floor display system, comprising an electronic display device associated with and in a plane substantially parallel to a floor, wherein said electronic display device is modifiable by a computer to display a first verbal image that is electronically changeable in place to a second verbal image different from the first.

73. The floor display system of claim 72, further comprising a detection mechanism configured to detect an indication associated with a presence or activity of a person, and to cause the floor display system to perform a corresponding action in response.

74. The floor display system of claim 72, wherein the electronic display device includes at least one of electronic ink, electronic paper, liquid crystal, light-emitting polymers, light-emitting diodes, organic light-emitting diodes, an electroluminescent display, a plasma display, a field emission display, a ferroelectric display, a fiber optic display, a holographic display, a micro-mechanical component, and a pixel.

75. A floor covering having an electronic display associated therewith and arranged to face upwardly from the floor for viewing through a transparent protective cover, wherein the electronic display is capable of displaying an electronically changeable verbal message.

76. The floor covering of claim 75, wherein the electronic display includes at least one of electronic ink, electronic paper, liquid crystal, light-emitting polymers, light-emitting diodes, organic light-emitting diodes, an electroluminescent display, a plasma display, a field emission display, a ferroelectric display, a fiber optic display, a holographic display, a micro-mechanical component, and a pixel.

* * * * *